United States Patent [19]

Fernandez et al.

[11] Patent Number: 5,080,739
[45] Date of Patent: Jan. 14, 1992

[54] METHOD FOR MAKING A BEAM SPLITTER AND PARTIALLY TRANSMITTING NORMAL-INCIDENCE MIRRORS FOR SOFT X-RAYS

[75] Inventors: Felix E. Fernandez, Mayaguez, P.R.; Charles M. Falco, Tucson, Ariz.

[73] Assignee: The United States of America as represented by the Secretary of the Air Force, Washington, D.C.

[21] Appl. No.: 534,823

[22] Filed: Jun. 7, 1990

[51] Int. Cl.$^5$ .............................................. B32B 31/00
[52] U.S. Cl. .................................. 156/155; 156/281; 156/289; 264/317
[58] Field of Search ............... 156/155, 289, 281, 246, 156/247; 264/317; 350/642, 96.12; 378/70; 427/336, 337

[56] References Cited

U.S. PATENT DOCUMENTS

| | | | |
|---|---|---|---|
| 3,654,009 | 4/1972 | Judd et al. | 264/317 X |
| 3,894,792 | 7/1975 | Komatsubara et al. | 350/160 R |
| 4,141,621 | 2/1979 | Aagard et al. | 350/96.12 |
| 4,255,208 | 3/1981 | Deutscher et al. | 156/155 X |
| 4,372,642 | 2/1983 | Singer et al. | 350/96.12 |
| 4,640,585 | 2/1987 | Nojiri | 350/413 |

FOREIGN PATENT DOCUMENTS 60-38130  2/1985  Japan .................................. 156/155

OTHER PUBLICATIONS

*Webster's Seventh New Collegiate Dictionary*, G. & C. Merriam Company, 1965, pp. 331 and 332.
Luskin, L. S., *Modern Plastics Encyclopedia*, 1983-1984, p. 14.

Primary Examiner—Michael W. Ball
Assistant Examiner—Jeff H. Aftergut
Attorney, Agent, or Firm—Irwin P. Garfinkle; Donald J. Singer

[57] ABSTRACT

A method is disclosed for making free standing multilayer films by depositing the films on a soluble substrate. The substrate solvent combination is chosen so that the solvent will not effect the multilayer materials. After deposition on the substrate, the multilayer films are cemented to a flat and smooth frame, in which a hole or window of the desired size and shape has been previously drilled. The adhesive, the films and the frame are insoluble in the chosen solvent for the substrate. After the adhesive is set, the substrate is dissolved leaving the multilayer film free standing within the frame. Also disclosed is a method for providing the films with a curvature.

11 Claims, 1 Drawing Sheet

METHOD FOR MAKING A BEAM SPLITTER AND PARTIALLY TRANSMITTING NORMAL-INCIDENCE MIRRORS FOR SOFT X-RAYS

STATEMENT OF GOVERNMENT INTEREST

The invention described herein may be manufactured and used by or for the Government for governmental purposes without the payment of any royalty thereon.

BACKGROUND OF THE INVENTION

The development of soft x-ray light sources, such as x-ray lasers and synchrotrons, depends upon the availability of suitable optical components. This is also true for a number of potential applications of x-ray optics, such as x-ray microscopy, lithography, plasma physics diagnostics, medical imaging, lasers, astronomy, etc. Unfortunately, the index of refraction of all materials in the wavelength range below approximately 1000 Å is very close to 1.0, so that the amount of light reflected at normal incidence (90°) onto a single interface (such as a silver film or glass) is less than a few percent for x-ray wavelengths below 300 Å.

Since for angles sufficiently close to grazing (i.e. 0°) the reflectivity for metals approaches one, reflective optical elements can be fabricated in the x-ray range. However these "grazing incidence optics" suffer from a number of deficiencies, including severe off-axis abberations and large size. For these reasons, normal incidence optics are highly desirable.

Recently it has become possible to produce multilayer thin film coatings with sufficient perfection to have reasonable reflectivities (>25 percent) in the soft x-ray range of the spectrum (approximately 20-500 Å). This makes possible the use of these multilayer coatings for reflective optics. These multilayer coatings are fabricated to make use of the constructive interference properties of light, so that the light reflected from each interface in the multilayer will add with the correct phase relationship to give a high final reflectivity for the coating. The spacing of the layers in the multilayer can be accurately designed using knowledge of the optical constants of the components, and is optimized for the particular application (i.e. polarizer, normal-incidence mirror, etc.). Because the multilayer must provide constructive interference, in most cases the layers will have a thickness of roughly ¼ the wavelength of light, e.g. 25 Å for 100 Å light. The total number of layers required, and hence the total multilayer film thickness, will depend upon the application, but will typically be much less than 1 micro-meter (40 micro-inches).

These multilayer coatings must be deposited on smooth, flat substrates to provide support during the fabrication process. Silicon wafers, glass, and sapphire are common substrate materials, although other materials may be used. Typically these substrates are at least 0.5 mm (0.020") thick to provide sufficient strength for the processing steps. All materials strongly absorb soft x-rays. Because of this, any x-rays transmitted through the multilayer will be completely absorbed by the substrate. This makes it very difficult to make laser cavity mirrors or transmission polarizers which require part of the beam to pass completely out of the system. Schemes have been developed to deposit the multilayer on a Si wafer, and then to preferentially etch through a photolithograpically defined mask in the back of the wafer to leave a small region of free standing multilayer without a substrate on the back. SiN membranes created by diffusion or ion implantation, followed by subsequent etching of the Si wafer have also been used to make transmission through the supporting substrate possible. These technologies require the use of Si substrates, which then limits the possible multilayers which can be grown since some multilayer materials are incompatible with Si. Also, other substrates can be much smoother than Si, which is an advantage for obtaining highest performance.

SUMMARY OF THE INVENTION

In accordance with this invention, to overcome certain of the deficiencies of the prior art by providing a method for making free standing multilayer films by depositing the films on a soluble substrate. The substrate solvent combination is chosen so that the solvent will not affect the multilayer materials. After deposition on the substrate, the multilayer films are cemented to a flat and smooth frame, in which a hole or window of the desired size and shape has been previously drilled. The adhesive, the films and the frame are insoluble in the chosen solvent for the substrate. After the adhesive is set, the substrate is dissolved leaving the multilayer film free standing within the frame. Also disclosed is a method for providing the films with a curvature.

A search of the prior art revealed a number of patents showing thin film optical elements, to wit:

U.S. Pat. No. 3,894,792 to Komatsubara which teaches the deflection of a semiconductor PN junction;

U.S. Pat. No. 4,141,621 to Aagard which shows a three layer waveguide for a thin film lens;

U.S. Pat. No. 4,372,642 to Singer which shows a multilayer thin film for absorbing light interference; and U.S. Pat. No. 4,640,585 to Nojiri which shows a thin film semiconductor lens.

None of the prior art known to applicants shows the method for making a free standing, multilayer thin film optical element as disclosed and claimed by the applicants.

OBJECTS OF THE INVENTION

It is an object of this invention to provide a method for making a free standing thin film optical element.

It is a more specific object of this invention to provide a free standing multilayer thin film optical element by depositing such a film on a soluble substrate, then cementing a frame to the film, and thereafter dissolving the substrate without affecting the film.

BRIEF DESCRIPTION OF THE DRAWING

Further objects and advantages of this invention will become apparent by referring to the following specification and drawing in which.

DESCRIPTION OF THE PREFERRED EMBODIMENTS

Figure 1:
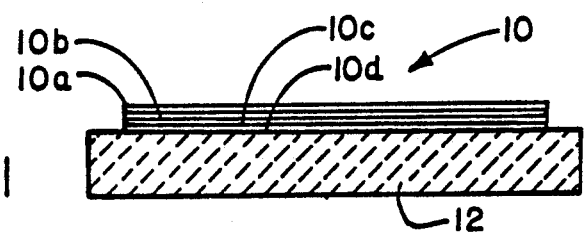
FIGS. 1, 2 and 3 illustrate a first embodiment of the invention, and show the various steps of the described method for making a free standing film.
Figure 2:
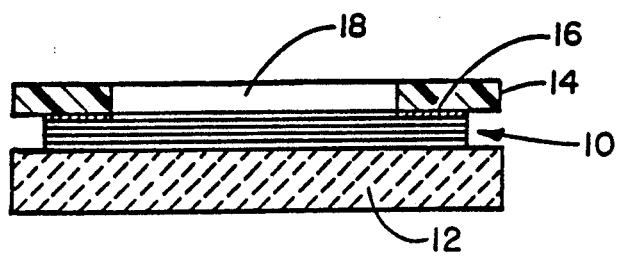
Figure 3:
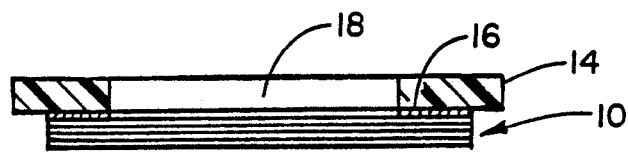

Referring to FIG. 1, the multilayer thin film coating 10 is shown as comprising four very thin layers 10A, 10B, 10C and 10D which are incapable of self support during the fabrication process. In order to provide temporary support for the coating during fabrication, the layers are deposited on a soluble substrate 12. The solvent for the substrate 12 is chosen such that it will not affect the multilayer materials. For example, NaCl, KBr or KCl substrates, with water as solvent, can be used with most metals and semiconductors. Aluminum substrates and NaOH as solvent can be used in some cases.

If the structure to be fabricated is not symmetric through the multilayer, it is deposited "upside down" on the substrate. Any deposition method can be used (evaporation, sputtering, etc.) as long as the first material to be deposited is compatible with the substrate.

After deposition is completed, the structure is cemented with an adhesive 16 to a flat and smooth piece which serves as a frame 14. A hole of the desired shape and size (the "window") has been previously machined on this piece. For most applications, a circular window will be used. The maximum possible size for the window might be limited because of the multilayer thickness and component material's tensional strength. Some experimentation in this respect might be necessary for each given structure.

The adhesive used to bond the multilayer structure to the frame must have low viscosity and must coat the frame uniformly in order to produce a smooth and flat adhesive layer between the frame and the multilayer. This helps prevent buckling of the multilayer. If the buckling occurs, it might later extend through the window, ruining the structure.

The adhesive must be compatible with the materials to be cemented. It should also be insoluble in the solvent to be used. Commercially available thermo-setting cements which have been produced for the optics industry have been found adequate.

After the adhesive has set, the device is bathed in the solvent until the original substrate is completely dissolved. Fluid motion should be kept to a minimum to avoid tearing the multilayer in the window region. It might be necessary to rinse the device in water or alcohol if the solvent used does not evaporate readily or leaves a residue. A free-standing multilayer has thus been produced over the window region.

In this flat configuration, the structure can be used in any application where partial transmission of light though the multilayer is desired. For example, it can be used as a beam splitter for interferometric applications or as an end mirror for a laser cavity in a flat-flat or a flat-circular configuration.

Figure 4:
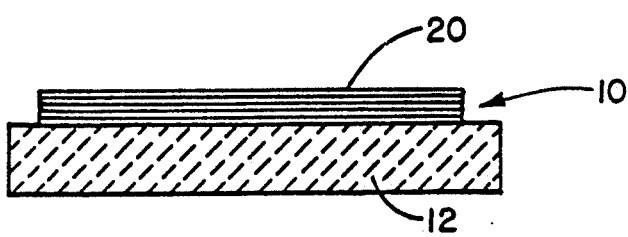
FIGS. 4, 5 and 6 illustrate the second embodiment of the invention, and show the various steps of the described method for making a curved free standing film.
Figure 5:
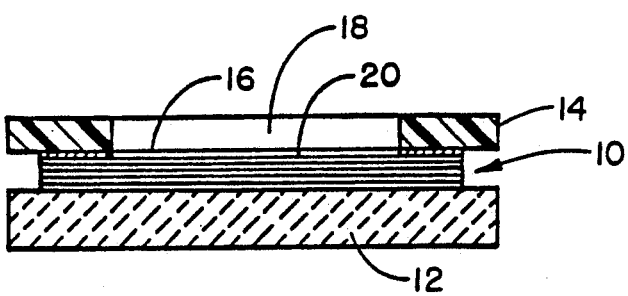
Figure 6:
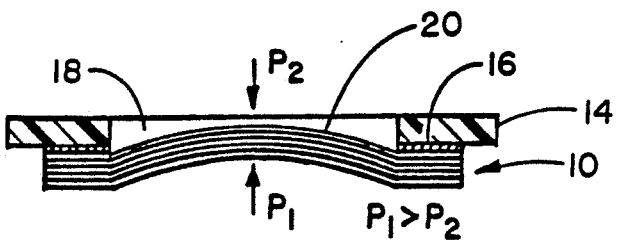

FIGS. 4-6 show a modification for producing curved reflectors. In this modification, the same steps are followed as in the previous embodiment, with the addition of a thin flexible membrane 20 to provide additional strength. The membrane 20 is shown applied to the frame 14, but it may also be applied to the outermost coating layer 10D, depending on the system requirements.

The membrane and the coating are then curved by applying a slight pressure difference between the two sides of the multilayer on a circular window, thus curving it slightly.

In the example illustrated in FIGS. 4-6, the structure can be used only as a reflector, since very little radiation will be transmitted through the membrane. A flat multilayer structure designed as a soft x-ray mirror for normal incidence can thus be shaped into a paraboloid and used as a collimating mirror with a (variable) long focal length. The maximum curvature near the vertex achievable for a given configuration will depend on the tensile strength of the materials used. The focal length can be varied continuously from infinity down to the value corresponding to this maximum curvature.

ADVANTAGES

A common procedure for producing free-standing films is to deposit these on a salt substrate, which is later dissolved. The film is floated-off and picked on a wire mesh. This procedure is difficult with very thin or brittle films. The handling of the films during flotation can easily cause some bending that might damage a multilayer structure. Furthermore, a film picked in this way will sag in the mesh.

The technique described here eliminates these problems. The film is never bent, and it will not sag once on the window, except elastically, under its own weight, this being a very small effect.

The preferential etching technology mentioned before requires a Si substrate. The technique described here does not, while substrate selection is limited to those that can be dissolved without affecting the multilayer.

In summary we have described a method whereby thin, free-standing multilayers can be produced over apertures of any desired shape. The multilayer structure is never bent during the process and is always in essentially the same state of tension as when it was deposited. The technique will be useful to produce semi-transparent X-UV and soft x-ray reflectors to be used as end mirrors for laser cavities, beam splitters, etc.

While this invention may be susceptible to various modifications and adaptations, it is intended that the invention be limited only by the appended claims as interpreted in the light of the prior art.

What is claimed is:

1. The method of making a free standing multilayer thin film optical element comprising the steps of:
   depositing a plurality of layers of films on an optically smooth planar substrate, the first of said deposited layers being compatible with said substrate, said substrate being soluble in a solvent;
   affixing a smooth flat frame to said film with an adhesive, said frame having a circular opening therein, said frame, said film and said adhesive being unaffected by said solvent;
   dissolving said substrate in said solvent, whereby said film is supported entirely by said frame, and is free standing within said opening; and
   rinsing said film and said frame to remove any residue of said solvent and said substrate.

2. The method of making a free standing thin film optical element comprising the steps of:
   depositing a film on an optically smooth planar substrate, said substrate being soluble in a solvent;
   affixing a smooth flat frame to said film with an adhesive, said frame having an opening therein, said frame, said film and said adhesive being unaffected by said solvent;
   dissolving said substrate in said solvent, whereby said film is supported entirely by said frame, and is free standing within said opening; and
   applying a slight pressure difference between the two sides of the film to produce a curve in said film.

3. The method of claim 2 wherein said film is deposited in thin layers, the first of said deposited layers being compatible with said substrate.

4. The method of claim 2, and further including the step of rinsing said film and said frame to remove any residue of said solvent and said substrate.

5. The method of claim 2 wherein said substrate is selected from a group consisting of NaCl, BBr and KCl, and the solvent is water.

6. The method of claim 2 wherein said substrate is aluminum and said solvent is NaOH.

7. The method of claim 2 wherein said adhesive is a thermo-setting cement insoluble in said solvent.

8. The method of claim 2 wherein said opening is circular.

9. The method of claim 2 wherein film is deposited in thin layers, and said film is supported by a thin flexible membrane.

10. The method of claim 9, and further including the step of applying a slight pressure difference between the two sides of said layers to produce a curve in said film.

11. The method of claim 10 wherein said opening is circular.

* * * * *